United States Patent
Huotari et al.

(10) Patent No.: US 8,782,252 B2
(45) Date of Patent: Jul. 15, 2014

(54) AUTOMATIC MAPPING OF HUMAN-MEANINGFUL PARAMETERS TO NETWORK-MEANINGFUL PARAMETERS FOR TRAFFIC IMPORTANCE IN HOME NETWORK

(75) Inventors: Allen Joseph Huotari, Garden Grove, CA (US); Siddhartha Dattagupta, Fullerton, CA (US); Chong Liang Li, Chino Hills, CA (US); Kendra Harrington, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 12/165,004

(22) Filed: Jun. 30, 2008

(65) Prior Publication Data

US 2009/0327521 A1 Dec. 31, 2009

(51) Int. Cl.
*G06F 15/16* (2006.01)
(52) U.S. Cl.
USPC .................................. 709/227; 709/232
(58) Field of Classification Search
USPC ................................. 709/227, 232
See application file for complete search history.

(56) References Cited

U.S. PATENT DOCUMENTS

| | | | |
|---|---|---|---|
| 2004/0213273 A1* | 10/2004 | Ma ................................ | 370/401 |
| 2006/0002294 A1* | 1/2006 | Chapman et al. ............. | 370/229 |
| 2007/0157247 A1* | 7/2007 | Cordray et al. ................ | 725/47 |
| 2007/0174521 A1* | 7/2007 | Aritomi ......................... | 710/62 |
| 2007/0233287 A1* | 10/2007 | Sheshagiri et al. ............ | 700/83 |
| 2008/0127277 A1* | 5/2008 | Kuschak ........................ | 725/74 |
| 2008/0291930 A1* | 11/2008 | Damola et al. ................ | 370/401 |
| 2009/0019141 A1* | 1/2009 | Bush et al. .................... | 709/223 |

OTHER PUBLICATIONS

Bonjour Printing Specification. Version 1.0,2, Apple Computer, Inc. pp. 1-24, Apr. 12, 2005.
UPnP QoS Architecture:2, Song et al., Contributing members of the UPnP Forum. For UPnP Version 1.0, Document version 1:00, pp. 1-33. Oct. 16. 2006.

* cited by examiner

*Primary Examiner* — John Follansbee
*Assistant Examiner* — Glenford Madamba
(74) *Attorney, Agent, or Firm* — Patent Capital Group

(57) ABSTRACT

A method of automatically discovering home network device capabilities, ranking devices using the capabilities in accordance with ranking heuristics, and implementing traffic policy in accordance with the ranking.

21 Claims, 2 Drawing Sheets

Example System

Example System

Discovery/Correlation

Automatic Importance Establishment

AUTOMATIC MAPPING OF HUMAN-MEANINGFUL PARAMETERS TO NETWORK-MEANINGFUL PARAMETERS FOR TRAFFIC IMPORTANCE IN HOME NETWORK

FIELD OF THE INVENTION

The present application relates generally to automatically mapping human-meaningful parameters to network-meaningful parameters for establishing traffic importance in home networks.

BACKGROUND OF THE INVENTION

As networking and digital media technologies advance, network-enabled consumer electronic devices have been introduced that can store, manage, and/or playback different types of digital media content. For example, all of a user's digital music, video and photos may be stored on a network storage device, and a digital media player used to render all the content on the HDTV in a user's living room.

Because a network might not have sufficient bandwidth to carry all demanded traffic simultaneously, data may be prioritized using information in the data packets including, for example, destination IP address with subnet mask, originating IP address with subnet mask, source media access control (MAC) address, destination MAC address, protocol, source/destination port, and other network-meaningful parameters. As understood herein, however, these parameters are not necessarily meaningful to non-technical users, who may wish to define what traffic is more important to the user and what traffic is less important in terms of e.g., network devices that the user considers to be more important at particular times of day. Furthermore, it is possible that identical classifications for data can be generated based upon network-meaningful parameters, diminishing the value to the user of the quality of experience provided to the user.

BRIEF DESCRIPTION OF THE DRAWINGS

The details of non-limiting embodiments, both as to its structure and operation, can best be understood in reference to the accompanying drawings, in which like reference numerals refer to like parts, and in which.

DESCRIPTION OF EXAMPLE EMBODIMENTS

Overview

Accordingly, a method includes discovering device capabilities on a network and, using the device capabilities, ranking devices on a network in order of importance. Traffic is established on the network in accordance with the ranking.

In example embodiments, the capabilities include whether a device can display video (as opposed to only audio) and/or whether a device can display high definition (HD) video and/or whether a device can record content. The capabilities upon which ranking is based may also include pixel dimension.

Additionally, devices can be ranked by physical network connections, by data rate and/or by signal to noise ratio (SNR), and/or by device status. As an example heuristic that can be used for ranking, devices that can display high definition video are ranked higher than devices that can display only standard definition video and devices that can record and play back content are ranked higher than devices that can only play back content.

In another example, an apparatus has a processor and a computer-readable medium accessible to the processor and bearing a ranking of network devices. The ranking is based on automatically discovered capabilities of the network devices. The apparatus automatically establishes traffic policy in accordance with the ranking.

In another example, a residential gateway (RG) is configured to establish communication between a wide area network and a home network. The RG has a processor and a tangible computer-readable medium accessible to the processor and bearing instructions to cause the processor to automatically discover home network device capabilities. The instructions also cause the processor to rank devices using the capabilities in accordance with ranking heuristics to establish a ranking, and to implement traffic policy in accordance with the ranking.

Example Embodiments

Figure 1:
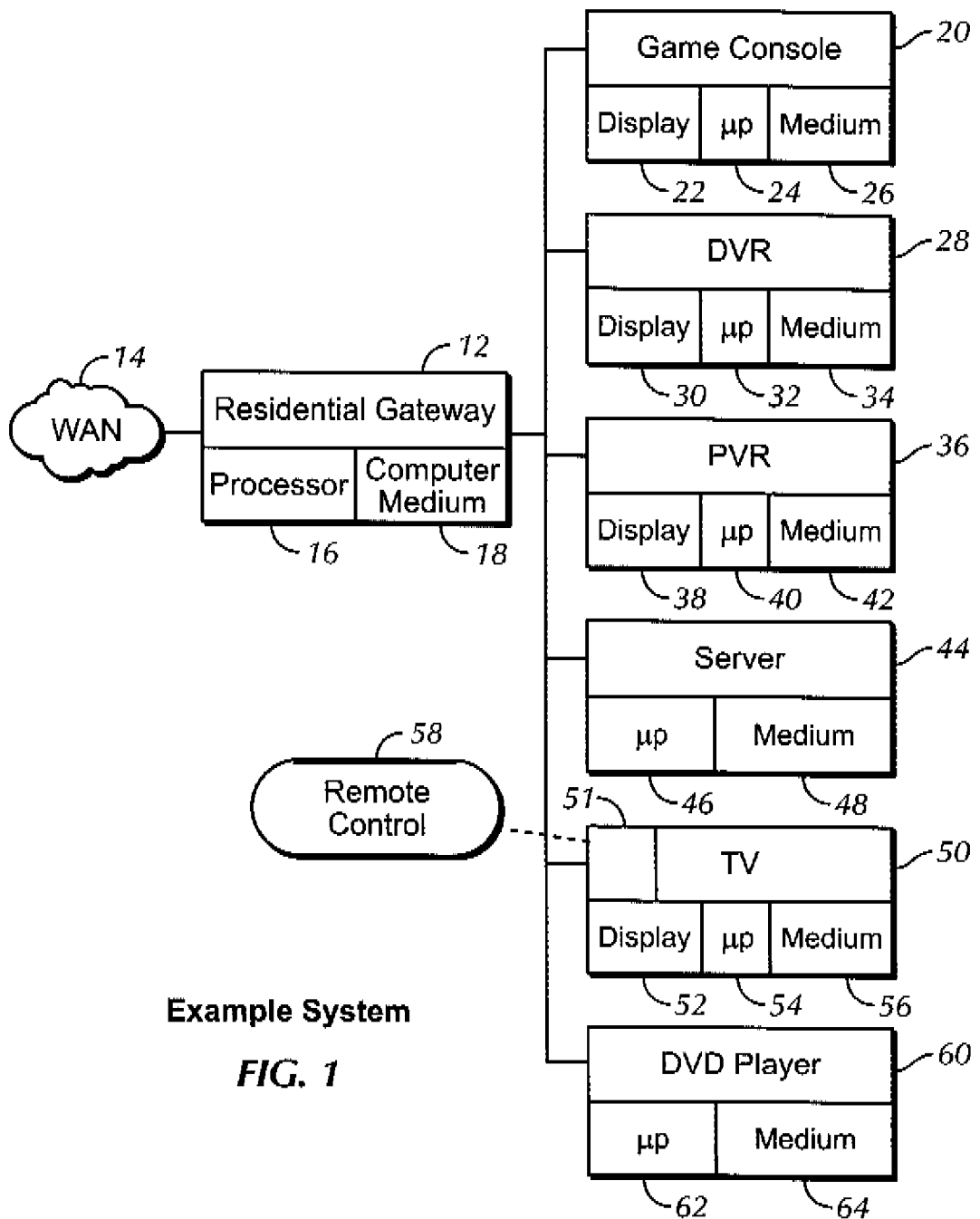
FIG. 1 is a block diagram of an example system.

Referring initially to FIG. 1, a home network is shown, generally designated 10, which includes a residential gateway (RG) 12 that is configured to establish communication between a wide area network (WAN) 14 and plural consumer electronics (CE) devices communicating over the home network using, in one example implementation, Universal Plug-n-Play (UPnP™). The RG 12 includes a RG processor 16 and a RG tangible computer-readable medium 18 accessible to the RG processor 16.

By way of a non-limiting example, the CE devices of the home network 10 may include game console 20 with video display 22, processor 24, and computer-readable medium 26. The home network 10 may also include a digital video recorder (DVR) 28 that in some embodiments may include a video display 30, processor 32, and computer-readable medium 34. The home network 10 may also include a personal video recorder (PVR) 36 that in some embodiments may include a video display 38, processor 40, and computer-readable medium 42. Further, the home network 10 may include a server computer 44 that includes a processor 46 and computer-readable medium 48. A TV 50 may also be included in the network 10, and the TV 50 typically includes, among TV components such as a tuner 51, a TV display 52, TV processor 54, and computer readable medium 56. The TV 50 may be controlled using a remote control 58. A DVD player 60 may also be on the network and can include a processor 62 and computer readable medium 64.

The logic described herein may be stored in the form of computer-readable code on any one or more of the above-described computer readable media for execution by any one or more of the above-described processors. In one embodiment the logic is implemented by the RG 12. In any case, the computer-readable media may be, without limitation, disk drives, solid state memory, etc.

Figure 2:
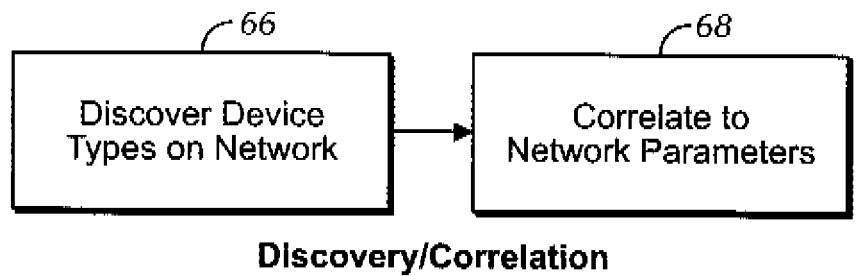
FIG. 2 is a flow chart of example logic.

Now referring to FIG. 2, initially a network device, e.g., the RG 12, discovers devices on the home network using device discovery principles known in the art, e.g., Universal Plug-n-Play (UPnP) device discovery, "Bonjour" discovery which uses Domain Name System (DNS) discovery (which could be implemented by, e.g., a DNS server embodied in the server computer 44, for example), and Dynamic Host Configuration Protocol (DHCP) (which could be implemented by, e.g., a DHCP server embodied in the server computer 44, for example).

Using UPnP as a non-limiting example, the following information can be ascertained for network devices. Assume four video renderers are discovered, along with the following capabilities. A first renderer may be a playback-only device that is configured to display high definition (HD), while a second renderer may be discovered to be both HD-capable and capable of recording as well as playback. A third renderer may be capable of only displaying standard definition (SD) video and may be capable of playback only, while a fourth renderer may found to be SD-only capable and also capable of recording, as well as playback. At block 68, the network devices are correlated to network parameters, e.g., media access control (MAC) addresses and/or Internet Protocol (IP) addresses and/or port numbers and/or other network parameters that are meaningful for routing traffic through the home network. Such a mapping may be stored in, e.g., the RG 12.

When DNS is used for discovery, appropriately tailored queries are issued to discover network devices and their capabilities. Such queries typically are responded with, among other things, the physical locations of the responding devices. The network device (e.g., the RG 12) implementing importance-based policy described below may query the DNS server for the above information. Multicast DNS, in which each device essentially includes its own DNS server, may also be used, meaning that a central repository is not needed for DNS records.

When DHCP is used, when each device requests an IP address from the DHCP server, the device also provides its capabilities to the DHCP server. Then, the network device (e.g., the RG 12) implementing importance-based policy described below may query the DHCP server for the above information.

Figure 3:
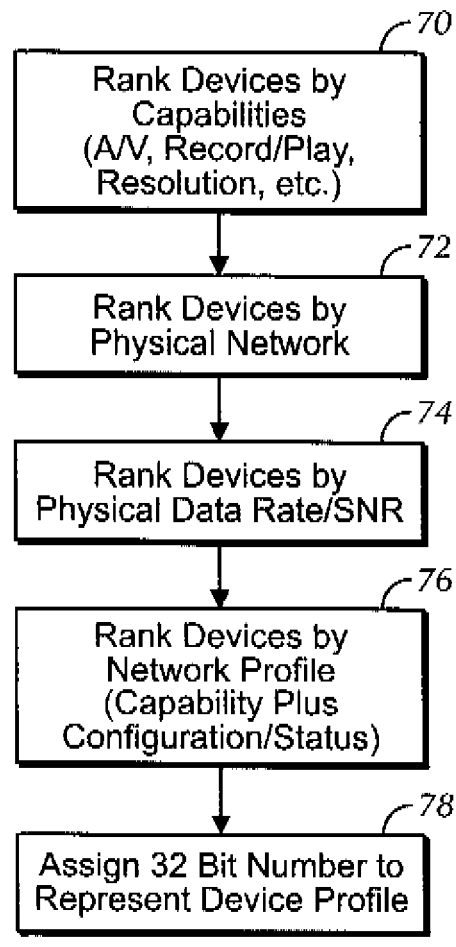
FIG. 3 is a flow chart of an example ranking logic.

After gathering device information from the devices on the network, the policy-implementing entity (e.g., the RG 12) ranks the devices automatically in terms of importance using heuristics, non-limiting examples of which are given herein. FIG. 3 illustrates various rankings that may be made by heuristic type, it being understood that the sequence of ranking by heuristic type need not necessarily follow the order in which this description discusses them.

Accordingly, commencing at block 70 devices are ranked by capabilities, including whether a device is an audio-visual device, device resolution (e.g., HD or SD), whether device can playback or also record, etc. Using the above example four video renderers, a ranking rule might be to rank recording devices higher than playback-only devices, and within those rankings, to rank HD devices higher than SD devices.

With that in mind, in the above example the devices would be ranked in order of importance as second device, then fourth device, then first device, then third device. Under these circumstances, network traffic would be controlled by a network device (e.g., the RG 12) implementing policy in accordance with the following example policy: any and all traffic intended for the second device is more important than any and all traffic intended for any other device; any and all traffic intended for the fourth device is more important only than any and all traffic intended for the first and third devices; and any and all traffic intended for the first device is more important only than any and all traffic intended for the third device.

Additionally, an importance policy can depend on further factors that in essence can be nested in higher order factors, it being understood that the hierarchy of factors given herein is merely for example. For example, as indicated at block 72, devices may be ranked according to the physical network they use within a home network. At block 74 devices may be ranked in accordance with PHY data rates they use and/or signal to noise ratio (SNR), and at block 76 devices may be further ranked by both network profile including their current configuration and status (online or offline, for instance).

Block 78 indicates that to represent its relevant ranking factors, a device may be assigned a ranking tag such as but not limited to a 32 bit number which represents the overall profile of the device in terms of the ranking factors considered in the automatic ranking heuristics.

As an example, the following data structures may be used as part of the ranking tag.

service type: This data type defines the service type of the device that is being auto-configured, e.g., whether the device is an audio system, a recorder, a playback-only device, etc. A device that can record may be considered by the heuristics to be more important than a device that cannot record. Other service types are contemplated herein, with the list above being for example only.

class of traffic: This data type defines the class of traffic that the device supports, e.g., whether the device acts as master server for synchronized audio streams (unicast or multicast), whether the device acts as an audio player for unicast audio stream, whether the device acts as an audio/video player, etc. An A/V device may be considered by the heuristics to be more important than an audio-only device.

network interface type: This data type defines the network interface type for the device, e.g., Ethernet™, 802.11, etc. This data type may be useful for ranking two devices with equal capability to be equally important if they are on different physical networks.

802.11 association parameters: This data type defines the 802.11 association parameters for the device, e.g., 802.11b (2.4 GHz band), 802.11g (2.4 GHz band), 802.11n (2.4 GHz band, 20 MHz channel), 802.11n (2.4 GHz band, 40 MHz channel), 802.11a (5 GHz band), 802.11n (5 GHz band, 20 MHz channel), 802.11n (5 GHz band, 40 MHz channel).

renderer resolution: This data type is applicable for AV players connected with a TV and specifies the resolution of the connected TV, e.g., 1080i (interlaced HD), 1080p (progressive HD), 720p (progressive HD), 576i (interlaced SD for PAL), 576p (progressive SD for PAL), 480i (interlaced SD for NTSC), 480p (progressive SD for NTSC). This data type may be useful for ranking, within HD/SD classifications, resolutions within those classes, with higher resolution HD, for example, being higher importance than lower resolution HD.

ID: Globally unique identifier for the device.

IP Address: IP Address of the device in x.x.x.x format (for, e.g., IPv4 as shown, IPv6 (16 octets), etc.

WMM support: This specifies whether the 802.11 network interface supports WMM™.

additional information: This data structure includes additional information for automatic ranking, including universally unique identifier (UUID, typically for Bluetooth devices), IP address, service type, traffic class (which may be conditionally optional), renderer resolution (which may be mandatory if service type is PLAYER and traffic class is a predetermined class).

Also, data can include network profile (a combination of capability, configuration, and status). This profile information may include the device's network interface, its 802.11 channel, whether WMM is true or false, the device's PHY rate in integer value, the device's 802.11 signal level at the network interface in nearest integer db value, and the device's 802.11 noise level at the network interface in nearest integer db value. These data fields may support heuristics such as giving higher importance to devices with higher PHY rates or better SNRs.

In non-limiting examples the above information may be provided in XML data format as follows:

```
<device_profile>
    <uuid>UUID</uuid>
    <ipaddr>IPADDRESS</ipaddr>
    <service>service_type</service>
    <tclass>traffic_class</tclass>
    <resolution>renderer_profile</resolution>
    <network_profile>
        <netnterface>network_interface</netinterface>
        <channel>802.11_channel</channel>
        <wmm>WMM</wmm>
        <phy_rate>integer</phy_rate>
        <signal_level>integer</signal_level>
        <noise_level>integer</noise_level>
    </network_profile>
</device_profile>
```

As mentioned above, a 32 bit number, for example, can be generated for each device profile submitted by the device at the time of auto-configuration. A non-limiting bitmap for this 32 bit number may be as follows:

bit(0)-bit(7): eight bits for the throughput as calculated based on device's network profile information. The following mapping can be used in the order of priority; higher the number higher is the priority.

11100000—5_N_20 and 5_N_40 (5 GHz band with 20/40 MHz channel)
11000000—5_A (5 GHz band)
10100000—2_4_N_20 and 2_4_N_40 (2.4 GHz band with 20/40 MHz channel)
10000000—2_4_G (2.4 GHz band)
00000000—2_4_B (2.4 GHz band)

bit(8)-bit(11): four bits used to map the renderer's profile information. The following mapping can be used in the order of priority; higher the number higher is the priority.

0111—1080p (Progressive HD)
0110—1080i (Interlaced HD)
0101—720p (Progressive HD lower)
0100—576p OR 480p (Progressive SD for PAL and NTSC respectively)
0010—576i OR 480i (Interlaced SD for PAL and NTSC respectively)

bit(12)—additional network flag. This flag bit will be set for any device that is added by user through an additional/external network device or application bit(13)-bit(15): three bits used to map the traffic classes. The following mapping can be used in the order of priority; higher the number higher the priority.

111—SYNC_AUDIO (synchronized audio)
110—AUDIO (single stream audio)
101—AV (audio/video class)

bit(16)-bit(17) two bits used to map the service types. The following mapping can be used in the order of priority; higher the number higher is the priority.

11—residential gateway (RG)
10—RECORDER or combined PLAYER and RECORDER
01—PLAYER bit(18)-bit(31) currently not used.

Additional heuristics that may be employed in accordance with principles above include:

Example of High Importance:
family room, recorder, high definition multimedia interface (HDMI) configured, record, high def live video, pre-scheduled Example of Medium Importance:
den, IP set-top box, component configured, view, high def broadcast, on demand Example of Low Importance:
kids room, DMA, composite configured, view recording (playback), on demand Once the devices are discovered according to FIG. 2 and ranked in order of importance according to FIG. 3, traffic policy is established by, e.g., the RG 12 to conform to the importances.

While the particular AUTOMATIC MAPPING OF HUMAN-MEANINGFUL PARAMETERS TO NETWORK-MEANINGFUL PARAMETERS FOR TRAFFIC IMPORTANCE IN HOME NETWORK is herein shown and described in detail, it is to be understood that the subject matter which is encompassed by the present invention is limited only by the claims.

What is claimed is:

1. A method comprising:
    discovering device capabilities for a device on a network by querying a dynamic host configuration protocol (DHCP) server, wherein the device capabilities are included in a request for a network address and include whether a device can display video and pixel dimensions;
    ranking devices on the network, wherein the ranking includes assigning a ranking tag to each of the devices and the ranking tag represents an overall profile of each of the devices;
    managing traffic on the network in accordance with the ranking, wherein the ranking encompasses whether the devices are online or offline, and the ranking encompasses a class of traffic, which can be supported by the devices;
    determining a resolution capability for each of the devices; and
    determining if particular devices are capable of recording data such that their associated packets are prioritized over other packets.

2. The method of claim 1, wherein the capabilities include at least one of: whether a device can display video, whether a device can display high definition (HD) video, whether a device can record content, pixel dimensions.

3. The method of claim 1, wherein the capabilities include all of: whether a device can display video, whether a device can display high definition (HD) video, whether a device can record content, pixel dimensions.

4. The method of claim 1, wherein the ranking act further comprises:
    ranking devices by physical network connections.

5. The method of claim 1, wherein the ranking act further comprises:
    ranking devices by data rate and/or by signal to noise ratio (SNR).

6. The method of claim 1, wherein the ranking act further comprises:
    ranking devices by device status.

7. The method of claim 1, wherein devices that can display high definition video are ranked higher than devices that can display only standard definition video and/or devices that can record and play back content are ranked higher than devices that can only play back content.

8. An apparatus, comprising:
    at least one processor device configured to;
    discover device capabilities for a device on a network by querying a dynamic host configuration protocol (DHCP) server, wherein the device capabilities include whether a device can display video and pixel dimensions;
    rank network devices and assign a ranking tag to each of the network devices, wherein the ranking tag represents an overall profile of each of the devices, wherein a respective network address is requested from the DHCP server by each of the devices, and the device capabilities are included in the request for the network address, the apparatus managing traffic policy in accordance with the ranking, wherein the ranking encompasses whether the devices are online or offline, and the ranking encompasses a class of traffic, which can be supported by the devices;

determine a resolution capability for each of the devices; and determine if particular devices are capable of recording data such that their associated packets are prioritized over other packets.

9. The apparatus of claim 8, wherein the capabilities include at least one of: whether a device can display video, whether a device can display high definition (HD) video, whether a device can record content, pixel dimensions.

10. The apparatus of claim 8, wherein the capabilities include all of: whether a device can display video, whether a device can display high definition (HD) video, whether a device can record content, pixel dimensions.

11. The apparatus of claim 8, wherein the ranking is further established based on physical network connections.

12. The apparatus of claim 11, wherein the ranking is further established based on physical link characteristics.

13. The apparatus of claim 12, wherein the ranking is further established based on device status.

14. The apparatus of claim 8, wherein devices that can display high definition video are ranked higher than devices that can display only standard definition video and/or devices that can record and play back content are ranked higher than devices that can only play back content.

15. A residential gateway (RG) configured to establish communication between a wide area network and a home network, the RG comprising:

at least one processor device; and at least one non-transitory computer-readable medium accessible to the processor and bearing instructions to cause the processor to:

discover home network device capabilities by querying a dynamic host configuration protocol (DHCP) server, wherein the device capabilities include whether a device can display video and pixel dimensions and were included in a request for a unique network address from the DHCP server;

rank devices using the capabilities in accordance with ranking heuristics to establish a ranking, wherein the ranking includes assigning a ranking tag to each of the devices and the ranking tag represents an overall profile of each of the devices;

implement traffic policy in accordance with the ranking, wherein the ranking encompasses whether the devices are online or offline, and the ranking encompasses a class of traffic, which can be supported by the devices;

determine a resolution capability for each of the devices; and determine if particular devices are capable of recording data such that their associated packets are prioritized over other packets.

16. The RG of claim 15, wherein the capabilities include at least one of: whether a device can display video, whether a device can display high definition (HD) video, whether a device can record content, pixel dimensions.

17. The RG of claim 15, wherein the capabilities include all of: whether a device can display video, whether a device can display high definition (HD) video, whether a device can record content, pixel dimensions.

18. The RG of claim 15, wherein the ranking is further established based on physical link characteristics.

19. The RG of claim 15, wherein the ranking is further established based on data rate and/or by signal to noise ratio (SNR).

20. The RG of claim 15, wherein the ranking is further established based on device status.

21. An apparatus comprising:

a residential gateway for discovering device capabilities for a device on a network by querying a dynamic host configuration protocol (DHCP) server, wherein the device capabilities include whether a device can display video and pixel dimensions and were included in a request from the device for a network address from the DHCP server;

a policy implementing entity for ranking devices on a network and assigning a ranking tag to each of the devices, wherein the ranking tag represents an overall profile of each of the devices, wherein the ranking encompasses whether the devices are online or offline, and the ranking encompasses a class of traffic, which can be supported by the devices, the policy implementing entity being configured for establishing traffic on the network in accordance with the ranking, determining a resolution capability for each of the devices, and determining if particular devices are capable of recording data such that their associated packets are prioritized over other packets.

* * * * *